United States Patent [19]

Truong

[11] Patent Number: 5,537,583
[45] Date of Patent: Jul. 16, 1996

[54] METHOD AND APPARATUS FOR A FAULT TOLERANT CLOCK WITH DYNAMIC RECONFIGURATION

[75] Inventor: Tuong K. Truong, Renton, Wash.

[73] Assignee: The Boeing Company, Seattle, Wash.

[21] Appl. No.: 280,974

[22] Filed: Oct. 11, 1994

[51] Int. Cl.⁶ .................. G06F 1/04; G06F 11/20
[52] U.S. Cl. ................ 395/550; 364/DIG. 1; 364/268.9; 364/270
[58] Field of Search .............. 395/550; 371/8.1, 371/61

[56] References Cited

U.S. PATENT DOCUMENTS

| | | | |
|---|---|---|---|
| 4,239,982 | 12/1980 | Smith et al. | 307/219 |
| 4,839,855 | 6/1989 | Van Driel | 364/DIG. 2 |
| 4,858,233 | 8/1989 | Dyson et al. | 371/9 |
| 4,868,826 | 9/1989 | Smith et al. | 371/9.1 |
| 4,907,232 | 3/1990 | Harper et al. | 371/36 |
| 4,984,241 | 1/1991 | Truong | 371/36 |
| 5,146,585 | 9/1992 | Smith, III | 395/550 |
| 5,377,205 | 12/1994 | Shi | 371/36 |
| 5,404,363 | 4/1995 | Krause et al. | 371/61 |

OTHER PUBLICATIONS

VanAlen et al.; "An All Digital Phase Locked Loop Fault Tolerant Clock"; IEEE Inter-Symposium on Circuit C System; Apr. 4, 1991; pp. 3170–3173.

Primary Examiner—Thomas M. Heckler
Attorney, Agent, or Firm—James P. Hamley

[57] ABSTRACT

A fail-operational/fail-operational fault tolerant clock includes a voting core comprised of triple redundant clock modules (30, 40, 50) and a floating hot spare module (60). Each module includes a voter (84) and fault detection, identification and reconfiguration circuitry (82) which operates to substitute the floating hot spare module produced clock signal for a failed voting core module signal without the introduction of transients or an asynchronous voted output. The modules (30, 40, 50, 60) are all preferably formed on a single semiconductor chip which includes isolation guard rings (32, 42, 52, 62) and independent power leads (34, 44, 54, 64) in addition to isolation buffering and point-to-point wiring to enhance fault tolerance.

32 Claims, 13 Drawing Sheets

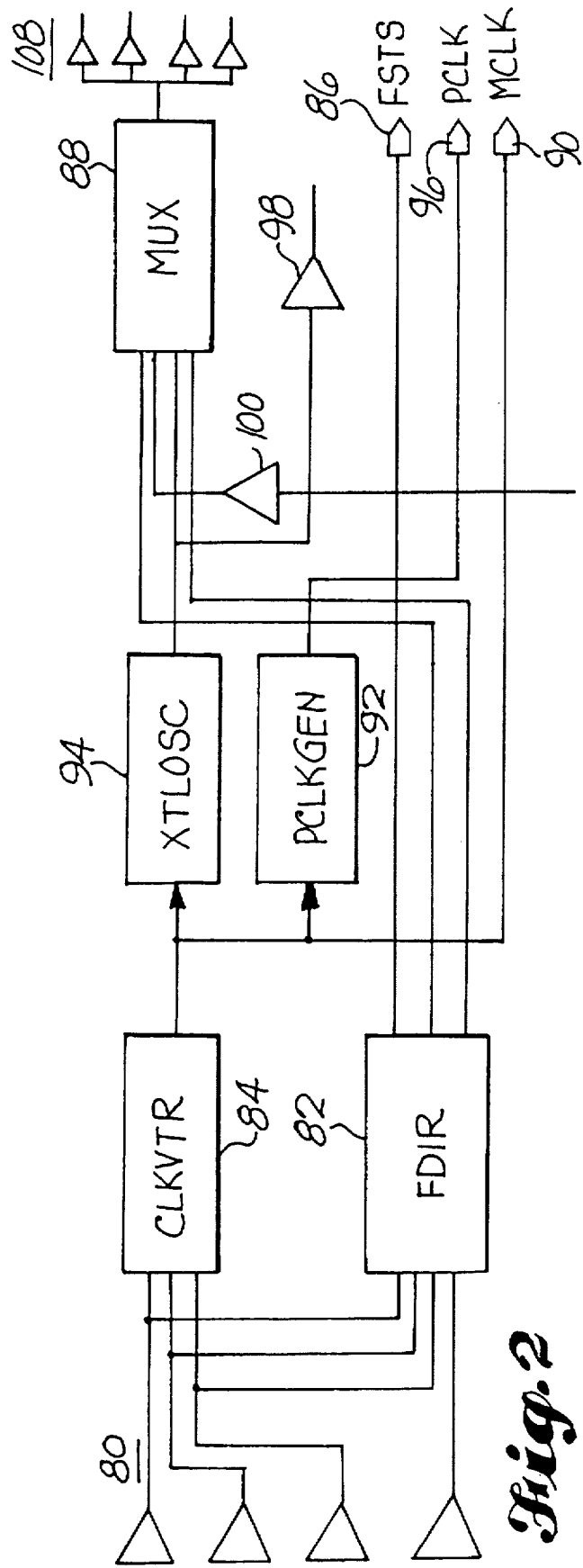
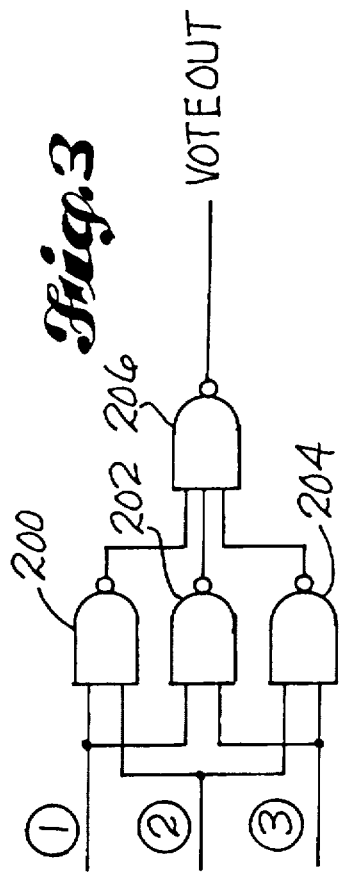

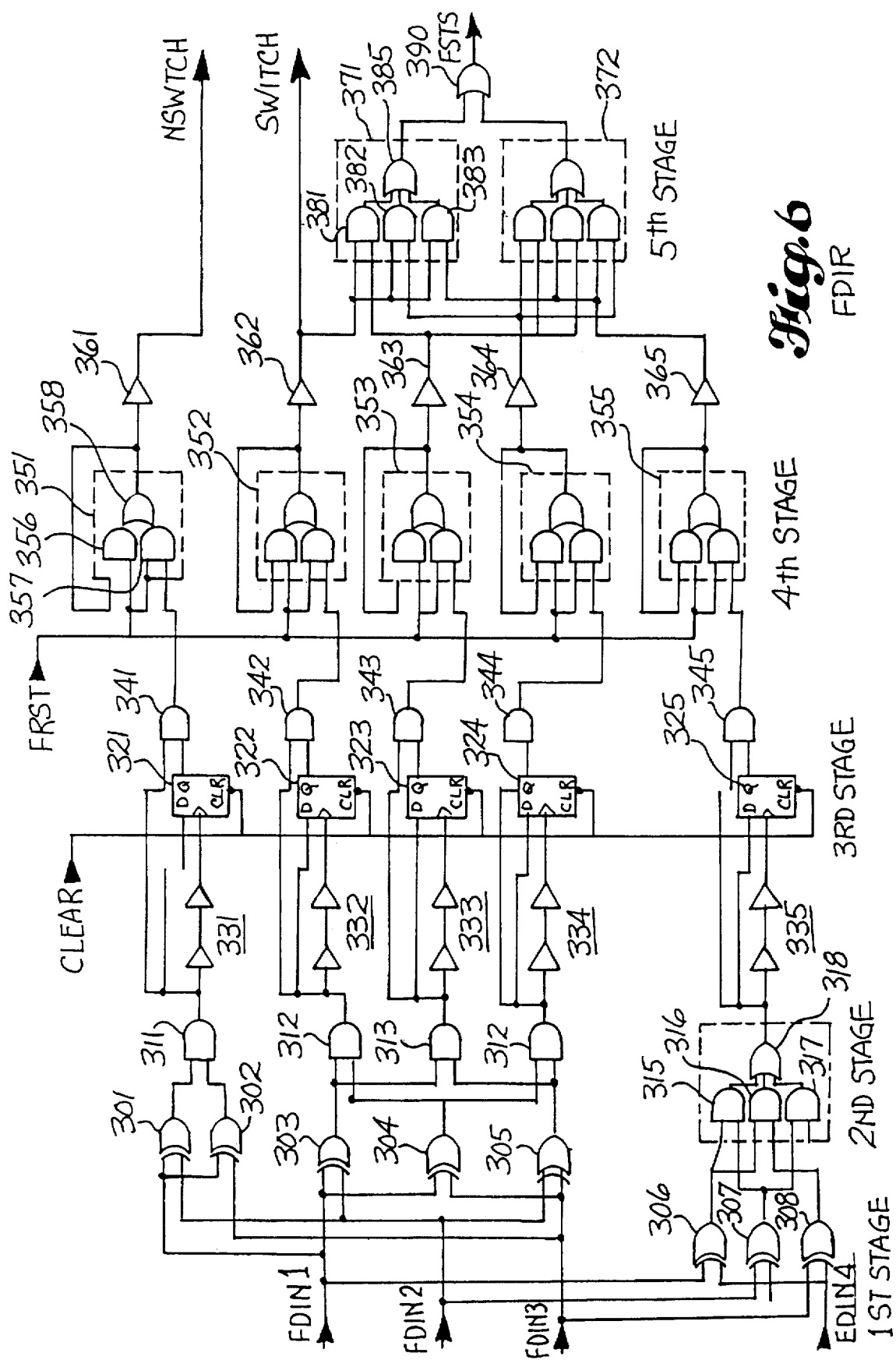
Fig. 6 FDIR

METHOD AND APPARATUS FOR A FAULT TOLERANT CLOCK WITH DYNAMIC RECONFIGURATION

BACKGROUND OF THE INVENTION

The present invention relates to an electronic clock and, in particular, to a highly reliable, synchronized fault tolerant clock which employs a hot spare clock module.

Numerous applications exist with requirements for extremely high reliability computing systems. One such application is in airborne electronic (avionic) systems wherein fault tolerance is achieved by the use of redundant systems, especially in flight control applications.

An essential element of a computing system is the clock. The clock provides the timing signals which control computer operation. Data distribution and various other functions are typically based on synchronous clock edges. Thus, to achieve high reliability, redundant clocks are often employed. However, to assure stable computer operation, it is important that the provided clock signal be independent of switching transients or asynchronous operation which might result from the switching in or out of the redundant clock signals.

Existing fault tolerant clock designs can be broadly classified as either software or hardware based. Software assisted architecture uses large time frame synchronization in the microsecond or millisecond range. It further requires the individual clock modules exchange their signals periodically for re-synchronization of the independent clocks. Software assisted systems take time to read and average the skews among the clock channels before bringing the clocks to synchronous agreement. Data is ignored when the clock skew grows beyond a predetermined threshold. The software algorithm asserts a large overhead on the system throughput. Software algorithms are not bit synchronous and are not suited for high performance or time critical applications.

Conventional hardware architectures using phase-locked loop techniques are complex and slow. Most of the existing fault tolerant clock designs are of this type. Each clock channel receives clock signals from the other channels to create a reference signal for its own phase-locked loop. The reference signal is fed to the phase detector where it is compared to the local clock signal. The phase difference is converted into a voltage level that is used to adjust the local oscillator. Since each channel forms its own reference and local signals, the clocks suffer from phase jitters. The phase-locked loop can only track slowly varying signals and fails in the presence of abrupt changes or signals that exceed its lock-in range.

Both the software and the phase-lock loop architectures require 3m+1 channels to tolerate m faults.

Another class of hardware architecture that can tolerate m faults using only m plus one channels is the standby sparing architecture. Here, the master clock is switched out and a spare (1 or more clock signals) is switched in. Switching is controlled by independent monitoring for a missing clock pulse. This does not provide 100% fault detection since it cannot detect phase jitters and phase drift and small changes in duty cycle. This architecture is also limited in that the receiving computer has to deal with clock switch-over transients.

Techniques are known in the art for combining N-modular redundancy with standby sparing, but such techniques can only be used for data and not the clock. Such designs use a centralized switching network known as an integrative cell array switch. The cell array is complex, exhibits a long propagation delay through many levels of gates and requires an external clock for synchronous switching of the modules.

To tolerate m faults, the teaching in the prior art requires the use of 3m+1 clock channels, 2m+2 clock channels or 2m+1 clock channels.

Thus, in accordance with the prior art teachings, in order to tolerate a single fault, a minimum of three modules (triple modular redundancy) is required. In order to tolerate two random faults (fail-operational/fail-operational), previous fault tolerant clock designs utilized five or more modules employing three-out-of-five voting systems. These architectures require excessive hardware.

Designs which use four modules with three-out-of-four voting schemes can only tolerate one random fault and limited compensating of benign faults. Three-out-of-four voting schemes also suffer from a two-out-of-two split situations. For example, there is no majority to vote on when two channels are out of phase with the other two. Reconfigurable voters using four channels to tolerate two faults also suffer from this drawback.

SUMMARY OF THE INVENTION

It is an object of the present invention, therefore, to provide a method and apparatus for a fault tolerant clock which overcomes the above-stated deficiencies of previous fault tolerant clock designs.

In particular, a fault tolerant clock in accordance with the invention employs a voting core comprised of a plurality of redundant clock modules, with each clock module producing an output clock signal. A provided floating hot spare clock module also produces an output clock signal. The fault tolerant clock system further includes a voter for producing a voted output clock signal from among the voting core redundant clock module produced output clock signals. Also provided is a fault detecting, synchronizing and switching means for detecting a fault in at least one of the voting core redundant clock modules and, responsive thereto, synchronously substituting the floating hot spare clock module produced signal for the faulted voting core redundant clock module produced signal, whereby the voted output signal from the fault tolerant clock remains stable despite a failure in a voting core clock module.

In a further aspect of the invention, a provided clock voter receives the output clock signals from the voting core clock modules and, in accordance with a predetermined voting algorithm, outputs a voted clock signal. A provided oscillator produces a periodic output signal. A provided multiplexer, having a pair of input terminals, an output terminal and a control terminal, responds to a control signal at its control terminal to switch a selected one of its input terminals to the output terminal. The module's own oscillator produced output signal is coupled to the multiplexer first input terminal and the output signal from the floating hot spare clock module oscillator is coupled to the multiplexer second input terminal. Provided fault detection identification and reconfiguration means monitors the output clock signal from each clock module and, responsive to detecting a fault in its own clock module, produces a control signal to switch the multiplexer from a state of outputting the clock module's own oscillator produced signal to outputting the floating hot spare clock oscillator produced signal.

In a further aspect of the invention, each clock module's oscillator is arranged to lock with the module's voted clock signal such that all clock module output signals tend to run synchronously.

In a further aspect of the invention, a processor clock generator is provided for predeterminedly processing the voted output signal to produce a clock signal suitable for application to a data processor.

In a further aspect of the invention, all clock modules are fabricated on a single semiconductor chip. Power is provided via independent power connections to each clock module. The semiconductor chip includes predetermined guard rings formed around each clock module to prevent propagation of latch up current from one clock module to any other clock module. The semiconductor chip also includes input and output pads for each clock module and the chip is formed with predetermined guard rings around each clock module input and output pad to prevent propagation of latch up current from one pad to any other pad. A data bus is formed on the semiconductor chip to interconnect the clock module and selected interconnections among the clock modules are buffer isolated and fabricated with point-to-point wiring such that multiple faults on the data bus can be tolerated.

BRIEF DESCRIPTION OF THE DRAWINGS

FIG. 2 is a schematic diagram illustrating the preferred embodiment of one of the clock modules shown in FIG. 1;

FIG. 3 is a detailed schematic diagram of the clock voter as shown in FIG. 2;

FIG. 6 is a detailed schematic diagram of the fault detection, identification and reconfiguration controller;

FIG. 7 is a detailed schematic diagram of the dual multiplexer;

DETAILED DESCRIPTION

Figure 1:
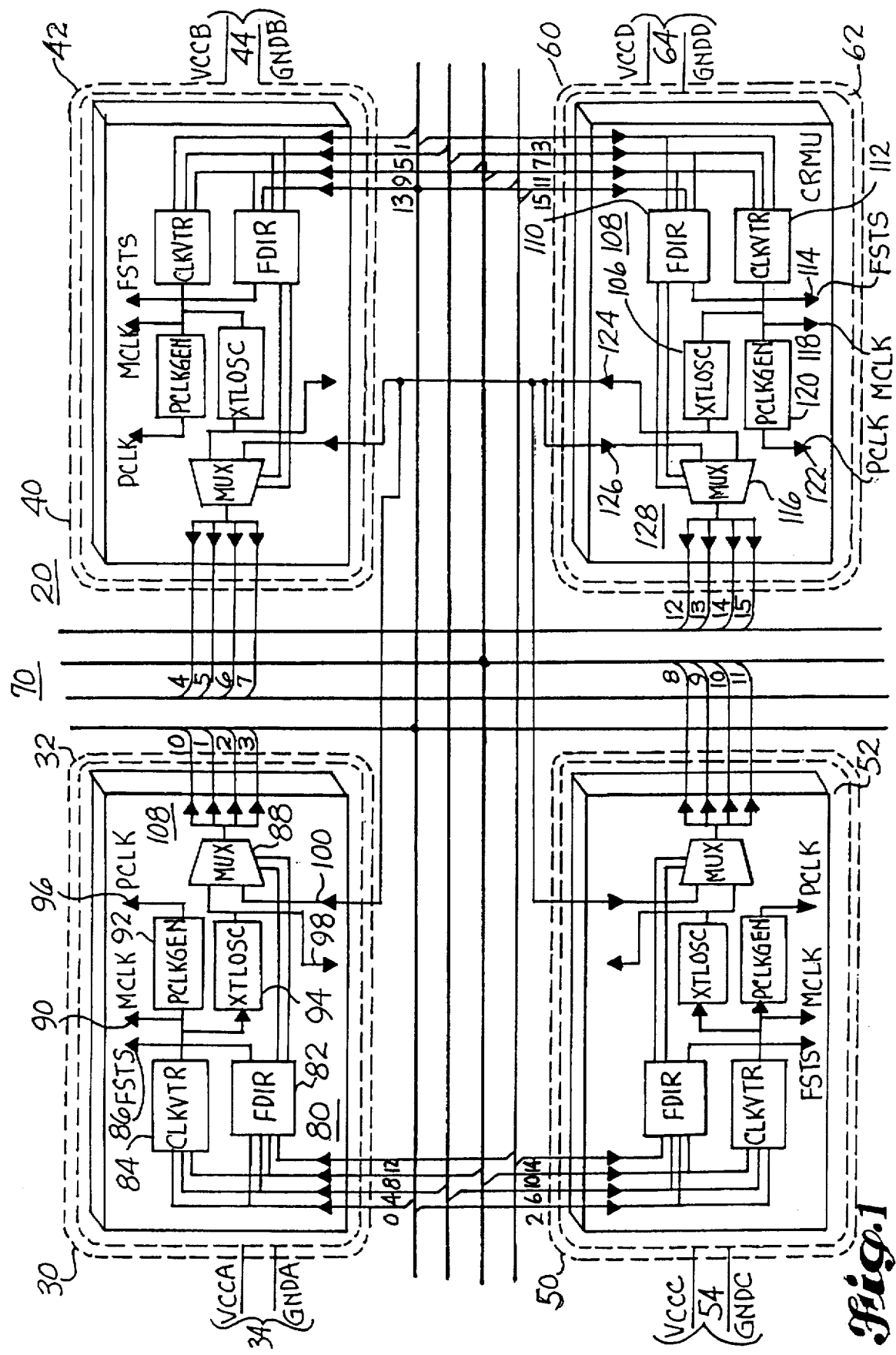
FIG. 1 is a block diagram illustrating the principal components of the preferred embodiment of the voting core module and floating hot spare.

FIG. 1 is a detailed block diagram illustrating the preferred construction of the inventive fault tolerant clock. Preferably, the entire system is formed as a single application specific integrated circuit (ASIC) indicated generally at 20. The system includes the voting core comprised of a triple modular redundancy arrangement of clock modules, 30, 40 and 50. Also provided is a floating hot spare clock module 60. Each of the four clock modules is provided with isolation guard rings 32, 42, 52 and 62 which, as is more fully described with respect to FIG. 10, prevents latch up current which could occur in one module from affecting any of the other modules. In addition, each module has it's own input power pairs 34, 44, 54, and 64.

Each module 30, 40, 50, 60 produces four redundant output signals which are coupled over a bus, indicated generally at 70, to the other modules. Thus, module 30 produces four redundant output signals, identified as 0–3, module 40 outputs four redundant signals identified as 4–7, module 50 produces four redundant output signals identified as 8–11 and the floating hot spare module 60 produces four output signals identified as 12–15. Each module receives as an input one of the output signals. Thus, module 30 receives as inputs the output signals 0, 4, 8, and 12. Module 40 receives as inputs the output signals 1, 5, 9, and 13. Module 50 receives as input signals 8–11. And, the floating hot spare module 60 receives as input signals 12–15.

Each of the voting core modules 30, 40 and 50 have similar internal circuitry, thus, only the components of module 30 are described herein below. In particular, each of the input signals 0, 4, 8 and 12 is coupled through one of four isolation buffers indicated generally at 80. The output from the isolation buffers 80 couple both to the input of a Fault Detection Identification Reconfiguration block (FDIR) 82 with each of the three signals from the voting core modules coupled via line 0, 4, and 8 applied to the input of a Clock Voter (CLKVTR) 84. The output from the FDIR block 82, which is described more fully herein below with respect to FIGS. 3 and 6, includes a fault status signal (FSTS) which is coupled through a buffer 86 and used as a fault status indicating signal as is described more fully herein below.

Also provided as control output signals from FDIR block 82 are a pair of control signals which are applied to the control inputs of an output multiplexer 88.

The output form CLKVTR block 84, as is described more fully herein below with respect to FIGS. 2 and 3, is the voted clock signal identified herein as the master clock MCLK, which is also buffered through an output buffer 90. The voted clock signal, MCLK, is also provided as an input to both a Processor Clock Generator block (PCLKGEN) 92 and a Crystal Oscillator (XTLOSC) block 94. The PCLKGEN block 92, which is described more fully herein below with respect to FIGS. 2 and 5, processes the MCLK voted signal to produce a quadrature phase clock signal PCLK which is provided via output buffer 96. The signal PCLK in this, the preferred embodiment, is a quadrature phased clock signal at one quarter of the frequency of the signal MCLK and at 25% duty cycle, which is suitable for driving an associated central processor (not shown). PCLK, if taking at different tap point in FIG. 5, can also be a 50% duty cycle clock signal at one half the frequency of MCLK.

As is described more fully herein below with respect to FIGS. 2 and 8, the XTLOSC block 94 produces a free running clock signal which is coupled to one input of the multiplexer 88. Also, the clock signal out of XTLOSC block 94 is passed to a buffer 98 which assures that the loading to the oscillator 94 is the same as for all other clock modules 40, 50 and, in particular, the hot spare floating module 60.

As is described more fully herein below with a respect to FIGS. 2 and 7, the remaining input to the multiplexer 88 is the output from a buffer 100 which receives as its input the signal coupled from the Crystal Oscillator block (XTLOSC) 106 of the floating hot spare module 60.

The output multiplexer 88 is passed to a bank of four buffers, indicated generally at 108, which feed the four above-described lines 0–3 coupled to the bus 70.

As mentioned above, voting core modules 40 and 50 are essentially identical to that as described above with respect to module 30.

Floating hot spare module 60 differs only slightly from the voting core modules 30, 40 and 50 in the way it is interconnected. Here, floating hot spare module 60 buffers the input signals over lines 3, 7, 11, and 15 via a bank of four buffer amplifiers indicated generally at 108. These four buffered signals are passed to the input of a Fault Detection Identification Reconfiguration (FDIR) block 110. Passed as the three inputs to a Clock Voter (CLKVTR) module 112 are the three input signals overlying 3, 7 and 11.

As with clock module 30, the output from FDIR block 110 includes a fault status signal (FSTS), which is buffered via a buffer 114, and a pair of controls signal which are applied to the control input of the output multiplexer 116.

The output from the Clock Voter (CLKVTR) block 112 is buffered via buffer 18 and provided as a voter clock signal MCLK. The signal MCLK is provided as an input both to a Processor Clock Generator (PCLKGEN) 120 and as the input to the Crystal Clock Module 6. The output from the Processor Clock Generator 120 is buffered via buffer 122 and provided as an output signal PCLK. Unlike the voting core modules 30, 40, and 50, the output from the Crystal Oscillator 106 of the floating hot spare module is applied as an input to each module's multiplexer via an output buffer 124. In fact, the same signal is coupled back through a buffer 126 and applied to the remaining input of the multiplexer 116.

The output from multiplexer 116 is buffered via a bank of four buffers, indicted generally at 128, and provides the respective output signals 12–15 from the floating hot spare module 160.

The interconnection between modules uses direct point-to-point wiring between the isolation buffers. There are $N^2$ interconnection (16 lines for the four channels). The isolation buffer network helps tolerate multiple faults on the bus 70 and prevents a single module failure that could bring down the bus. Without the buffers, a bridge fault that shorts any two clock lines of any two modules would fail both modules.

FIG. 2 is an expanded, detailed blocked diagram illustrating the internal components of the core module 30 as shown in FIG. 1. Here, each of the four input signals is buffered through the four input buffers, indicated generally at 80. All four buffered input signals are applied as inputs to the Fault Detection Identification Reconfiguration (FDIR) block 82, with the three signals from the all three core modules being coupled to the input of the Clock Voter (CLKVTR) block 84. The FDIR block 82, described more fully herein below with respect to FIG. 6, produces an output signal indicating system fault status FSTS, which is coupled through a buffer 86. In addition FDIR block 82 provides a pair of output control signals which are applied to the control input terminals of the output multiplexer 88.

The CLKVTR block 84, described more fully herein below with respect to FIG. 3, produces a voted clock output signal MCLK which is buffered through an output buffer 90. The signal MCLK is provided as an input both to a crystal oscillator (XTLOSC) 94 and a Processor Clock Generator (PCLKGEN) 92. The voted clock signal MCLK acts, in a manner described more fully herein below with respect to FIGS. 8 and 9, to create a phase lock with the free running crystal oscillator provided in XTLOSC block 94. The free running output signal from XTLOSC block 94 is provided as one input to the output multiplexer 88. Provided as a remaining input to the multiplexer 88 is the output from the crystal oscillator (106 of FIG. 1) from the floating hot spare module (not shown). A buffer amplifier 98 connects to the output of XTLOSC block 94 to provide similar loading to the crystal oscillator 94 as is encountered in the other modules.

The Processor Clock Generator module 92, as described in greater detail with respect to FIG. 5 below, produces an output signal PCLK which, through buffer 96, is suitable for driving an associated processor (not shown).

In an overview of system operation, the floating hot clock module 60 serves as a floating hot spare for each of the voting core modules 30, 40, and 50. When one of the voting core modules 30, 40, 50 fails, the floating hot spare module 60 signal is automatically switched in and the voting plane of the voting core is restored, all without switch overdelay and glitches (switching transients). Although the floating hot spare module's 60 input and output requirements differ slightly from the voting core modules 30, 40, and 50, all of the modules are designed and interconnected in such a way that the installation (replication) of identical silicon blocks ensures matching among redundant modules. Each of the modules 30, 40, 50 and 60 identifies itself and its required functions by the way it is connected, i.e. through the router. The floating hot spare module 60 is totally transparent to any host computer being supported by the fault tolerant clock. In addition, there is no effect on the voting core modules if the floating hot spare module 60 fails first.

The voting core modules 30, 40, and 50 are seen to employ a triple modular redundancy arrangement of oscillator's, each with a majority voter and feed back loop. The clock modules 30, 40, 50, and 60 communicate through an isolation buffer network to prevent a situation in which one module might short two or more of its clock inputs and thereby bring down the entire system. When tightly synchronized, the voting accomplished by the system can mask out any fault which occurs in the oscillator circuitry, including Byzantine faults. A Byzantine fault is a malicious fault that sends different signals to different modules (or perceived differently by different modules). A Byzantine fault can be devastating to a conventional majority voter with asynchronous or a loosely synchronous inputs.

The voting as provided by the voters of the present system can provide identical driving signals for each of the crystal oscillator's. With the crystal oscillators designed to have a common pulling range, phase differences among the modules are dynamically and continuously compensated by the crystals within each clock cycle. For central processing applications wherein a small frequency shift (less than 100 ppm or 0.01%) is inconsequential, inexpensive crystals can be used and frequency pulling can compensate for the differences in crystal aging, temperature variation and circuit deviation (process and components). Given the finite skew of process variation, the system clock outputs can be synchronized within a few nano-seconds.

It also should be noted that cross channel voting within the system set forth in FIG. 1 is performed only in the triple redundant core. Whereas the outputs of the multiplexers in the voting core modules feed back to their voters, the multiplexer output of the floating hot spare module 60 only goes to the FDIR controllers of all of the voting core modules 30, 40 an 50 for fault detection and identification purpose. When not switched in, the floating hot spare module 60 receives its inputs from the voting core modules 20, 30, and 50 to stay synchronous to the voting core and thereby not form a feed back loop upon itself. When the floating hot spare module 60 is switched in, it becomes part of the core and a direct feedback loop is thereby formed.

At the heart of the instant fault tolerant clock design is the FDIR controller. The FDIR controller in each module receives the clock signals from all four modules 30, 40 and 50. Each FDIR controller autonomously detects, identifies and registers the source of a fault. If the fault comes from within its own module, a self monitoring circuit disables the faulty clock and switches in the spare clock. Each module employs a complimentary pair of control signals for the dually redundant multiplexer. A non-coded word results in the multiplexer output being at the "0" level and therefore is detected. Each multiplexer is strategically positioned within the feedback loop of the oscillator to take advantage of the forthcoming voting stage, where switch-over delay and transient signals are effectively masked. The FDIR controller issues a warning to the system only after two modules have failed and the next fault may affect the system dispatch integrity.

With all active circuitry integrated on a single semiconductor chip, the off-chip crystal feedback loop contains the least reliable components. The voting logic and the reconfiguration logic are designed to cover these particular components to survive two sequential oscillator failures. Any fault that occurs outside the feedback loading loop is considered as a receiver fault. Faults in the clock output buffers, output clock pins or routing, processor clock state machine, and any other signals that are derived from the core oscillator are examples of this case.

The fault tolerant clock design as set forth herein can sustain two random faults (nonsimultaneous) and multiple compensating faults in all four modules. Compensating faults are faults that have no effect on the majority voting role. For example, all three clock outputs are still good if the spare clock fails first, the second fails stuck-at-low and the third clock fails stuck-at-high. Another example is the case that each of the four modules have one clock input (any clock input) fail randomly. Since each active channel is replaced by the same floating hot spare, all clock outputs are still functional if all three oscillators of the voting core modules fail. Upon power up, all resources are automatically retried.

FIG. 3 is a detailed schematic diagram illustrating a preferred embodiment of the clock voter, such as CLKVTR block 84 of FIGS. 1 and 2.

The clock voter is a majority rule 2-out-of-3 voter. If two of the inputs are tightly synchronized to each other, the third input can fail maliciously without effecting the voted output. As is described above with respect to FIG. 1, in the preferred embodiment the cross-channel voting is performed on the active voting core modules only. When the floating hot spare module is switched in, it becomes part of the voting core.

Shown as inputs to the clock voter are three signals, indicated 1, 2, and 3. The three clock signals are coupled to the inputs of three NAND gates 200, 202, and 204. Signal 1 is coupled to one input of NAND gate 200 and one input to NAND gate 202. Signal 2 is coupled to one input of NAND gate 200 and one input of NAND 204. Finally, signal 3 is coupled to one input of NAND gate 202 and one input of NAND gate 204.

The output logic levels from NAND gates 200, 202, and 204 are coupled to three inputs of an output NAND gate 206. The output from NAND gate 206 constitutes the voted output signal from the clock voter.

Figure 4:
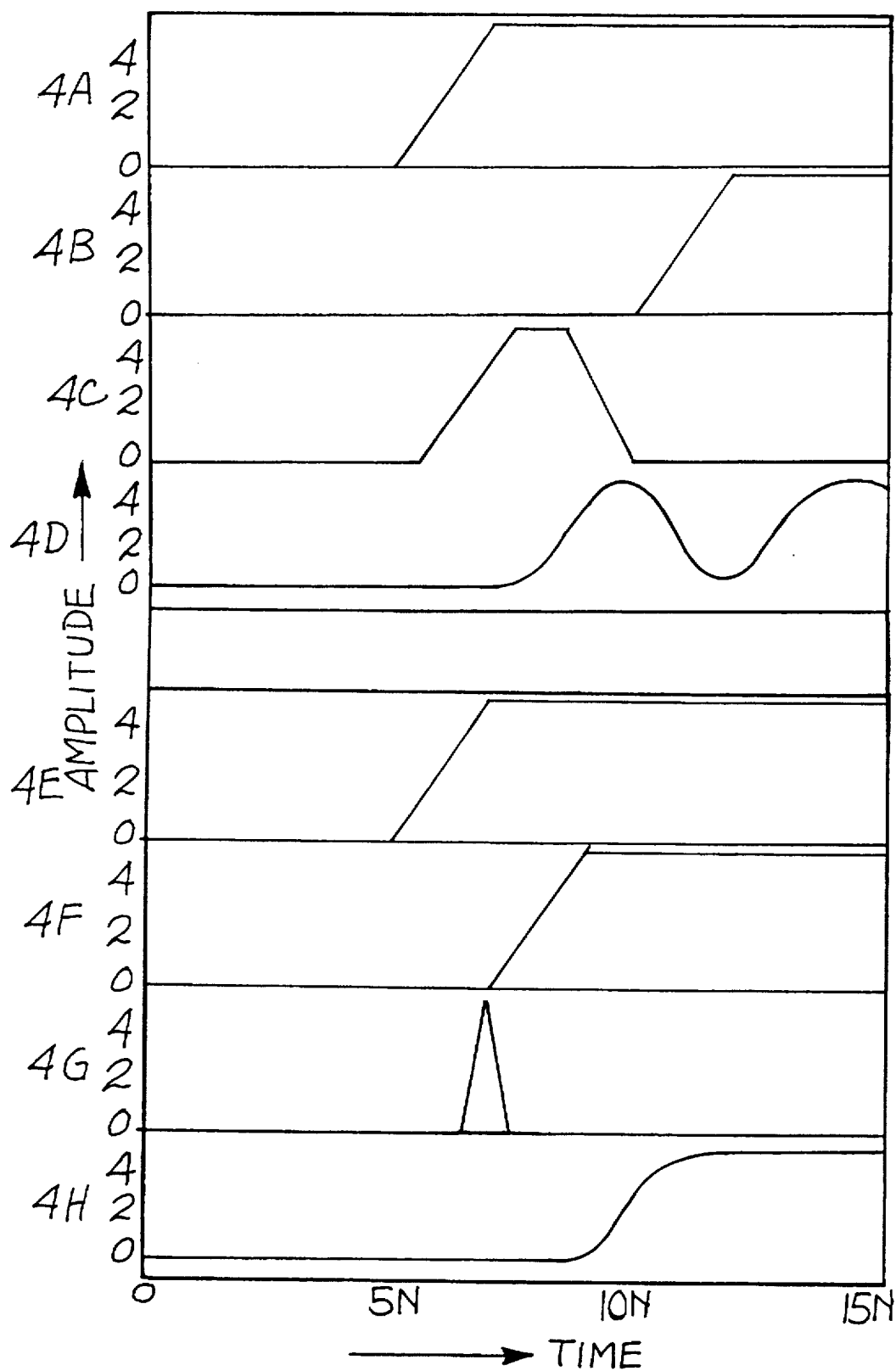
FIG. 4 depicts timing diagrams illustrating the tight synchronization realized by the preferred embodiment of the present invention.

FIG. 4 is a waveform diagram illustrating what could happen to a majority voter with loosely synchronized inputs. Shown on the vertical axis is amplitude in volts and in the horizontal axis is time in five nano-second increments.

Waveforms 4A–4D illustrate a loosely synchronized design. Here, FIGS. 4A–4C illustrate the three input signals 1, 2, and 3 as shown in FIG. 3. With loose synchronization, a displacement window of 5 nano-seconds exists between the two clock edges 4A and 4B. During this interval, the output from the clock voter, shown in 4D, follows the third input, shown in 4C, which is a transient in this example.

This loosely synchronized situation should be compared with the tight synchronization afforded by the present invention as shown in waveforms 4E–4H. Here, with the clock signals tightly synchronized within two nano-seconds, as shown in 4E and 4F a malicious third clock signal, is shown in 4G, is effectively filtered out at the output of the voter, as shown in waveform 4H.

Figure 5:
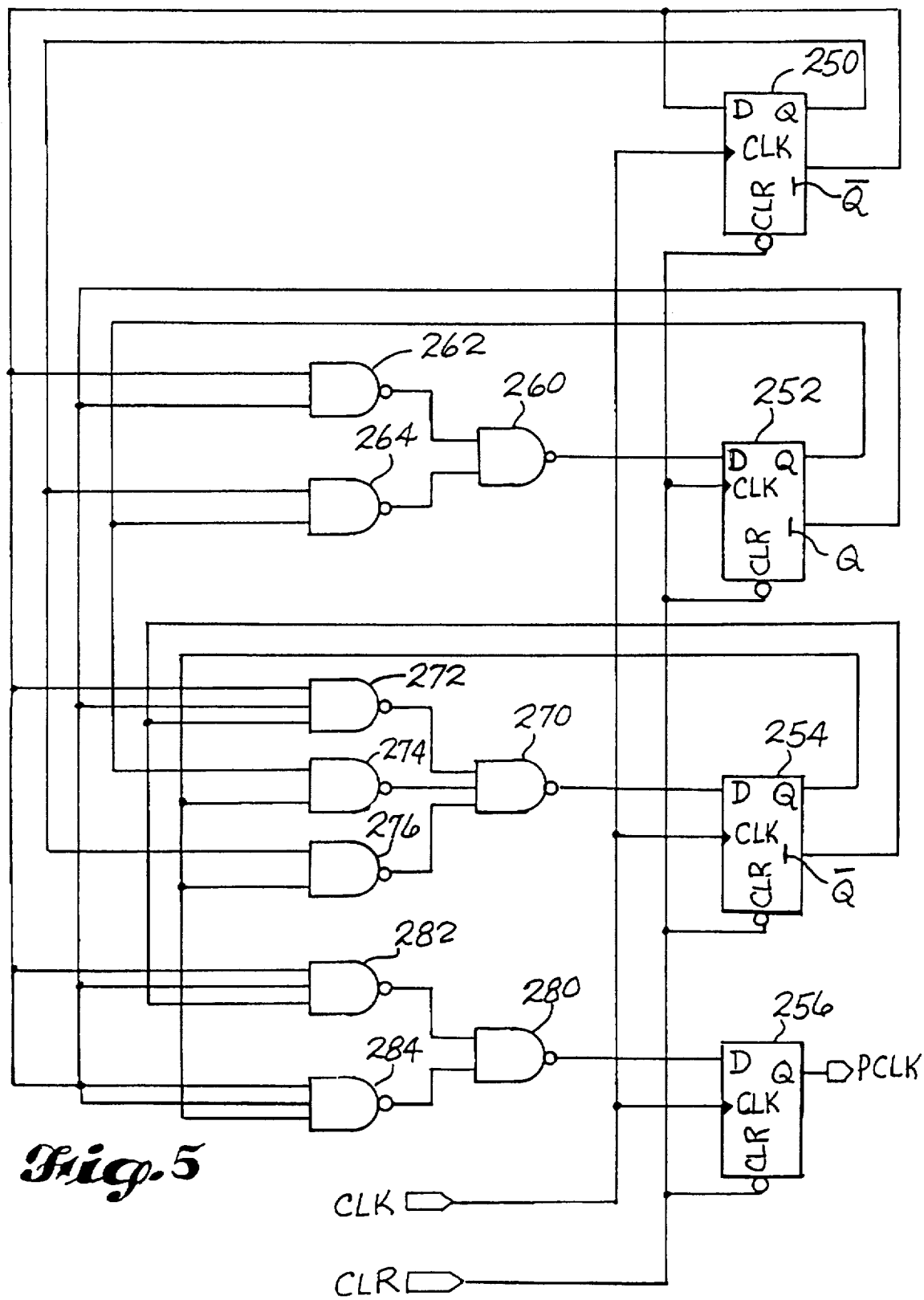
FIG. 5 is a detailed schematic diagram of the processor clock generator.
Figure 1:
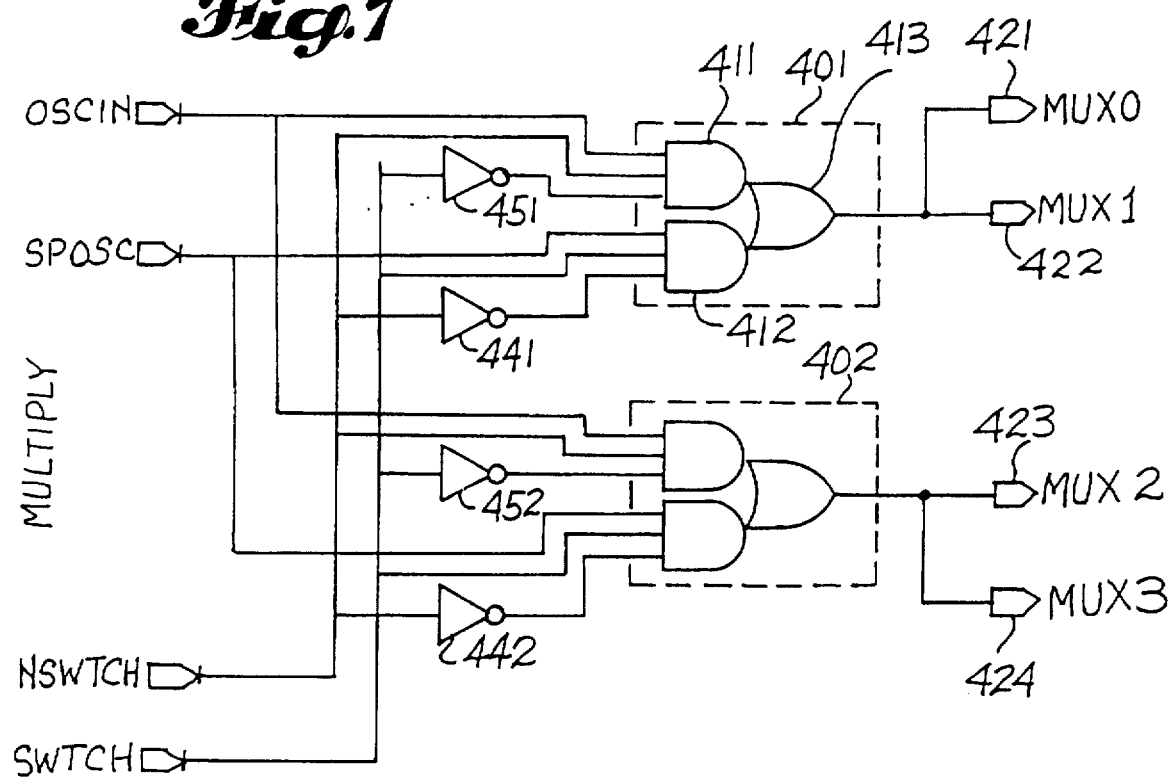

FIG. 5 is a detailed circuit schematic of the Processor Clock Generator, such as PCLKGEN block 92 of FIGS. 1 and 2. The PCLK generator is a state machine that receives the voted clock signal MCLK at its input and produces a clock signal that has one quarter of the input clock frequency at 25% of the input clock duty cycle at its output. This signal is suitable for application to an associated processor (not shown). Upon reset, the state machine is cleared and the PCLK output is set to a low state. Optionally, a clock signal with 50% duty cycle at half the frequency of the voted clock signal MCLK can be tapped from flip-top 250. In particular, the voted clock signal MCLK is coupled as the clock (CLK) input to each of four flip-flops 250, 252, 254, and 256. Applied to the clear (CLR) input of each of the flip-flops 250, 252, 254, and 256 is a system clear (CLR) signal. Depending on system requirements, MCLK and PCLK (either 50% or 25% duty cycle version) are both suitable for driving a micro processor.

Applied to the data input (D) of flip-flop 252 is the output from a NAND gate 260. Each of the inputs to NAND gate 260 is provided from the output of NAND gate 262 and 264.

Applied as the input (D) of flip-flop 254 is the output from a NAND gate 270. NAND gate 270 has three inputs corresponding to the outputs of NAND gates 272, 274, and 276.

The input (D) to flip-flop 256 comes from the output of a NAND gate 280. Each input of NAND gate 280 is supplied from the output from a pair of NAND gates 282 and 284. The Q output from flip-flop 256 comprises the processor clock signal PCLK.

The data input (D) to flip-flop 250 connects to flip-flop to the $\overline{Q}$ output of flip-flop 250. This signal is in turn applied as an input signal to NAND gates 262, 272, 282, and 284. The Q output from flip-flop 250 is coupled as an input signal to NAND gates 264 and 276.

The Q output from flip-flop 252 is provided as an input to NAND gates 264 and 274. The $\overline{Q}$ output from flip-flop 252 is provided as an input to NAND gates 262, 272, 282, and 284.

The Q output from flip-flop 254 is provided as an input to NAND gates 274, 276, and 284. The $\overline{Q}$ output from flip-flop 254 is provided as an input to NAND gates 272 and 282.

FIG. 6 is a detailed schematic diagram of the Fault Detection Identification and Reconfiguration controller, as shown, for example, as block 82, in FIG. 2. The FDIR controller receives the outputs from the three voting core modules, here indicated as FDIN 1, FDIN 2, and FDIN 3, respectfully. It also receives the output from the floating hot spare module, here indicated as FDIN 4. The FDIR controller performs mutual comparison and voting on the inputs to detect and identify a fault. There are five stages (from left to right) in five slices (from top to bottom) of circuitry in the FDIR controller.

The first stage is comprised of a series of eight (8) exclusive or (XOR) gates 301–308. These gates are arranged to process the input signals and detect any amptitude phase differences. The second stage is comprised of seven (7) AND gates 311–317 with AND gates 315–317 all driving the inputs OR gate 318. The AND gates 311–317 and OR gate 318 are arranged to identify which of the various clock modules is exhibiting a fault signal condition.

The third stage is comprised of five (5) D flip-flops 321–325. Each flip-flop is provided with a delayed signal via five (5) buffer pairs 331–335. A gate output is provided via AND gates 341–345. In this way, the third stage filters out transients with a tolerance of approximately 2 nano-seconds clock skew.

The fourth stage is comprised of five (5) latches 351–355. Each latch, such as 351 includes a pair of input AND gates 356, 357, the outputs of which feed an OR gate 358. The latches register a faulty status when a clock fails or is out of phase by more than a 2 nano-second tolerance. The outputs from the latches 351–355 are buffered via latches 361–365, respectfully. The buffered outputs from latches 351 and 352 constitute the self-monitoring complimentary pair outputs NSWTCH and SWTCH, respectfully, which are coupled to the multiplexer as shown in FIG. 7.

The buffered outputs from latches 352–355 are applied to the fifth stage combinational logic blocks 371 and 372. Each combinational logic block, such as logical block 371 comprises three (3) NAND gates 381–383 the outputs which couple to an OR gate 385. The outputs from the combinational logic blocks 371 and 372 are applied to the inputs of an OR gate 390, the output of which produces a maintenance alert output FSTS when two clock modules have failed and the third one might compromise operation of the system.

As is seen in FIG. 6, the top two slices of the FDIR controller provide a self-monitoring, complimentary pair of control signals to enable the multiplexer. The inputs to the controller block are arranged such that FDIN 1 is from the oscillator output from that particular channel. The middle three slices perform the FDIR function on the voting core modules. The bottom slice independently performs the fault detection and identification for the floating hot spare module.

FIG. 7 is a detailed schematic diagram of the multiplexer, such as multiplexer 88 in FIG. 2. Applied as inputs to this system are the output from the modules own crystal oscillator, here indicated as OSCIN and the output from the floating hot spare's crystal oscillator, here indicated as SPOSC. Applied as controlled inputs are the complimentary control signals NSWTCH and SWTCH, as provided out of the FDI controller shown in detail in FIG. 6.

The multiplexer includes a pair of combinational logic blocks 401 and 402. Each combinational logic block, such as block 401, includes a pair of three input AND gates 411 and 412, the outputs from which feed an OR gate 413. The outputs from the OR gate 413 comprise the selected outputs from the multiplexer and are buffered in four buffers 421–424 to provide the four buffered output signals, MUX0–MUX3.

The input oscillator signal OSCIN is coupled as an input to the first of the two AND gates, such as AND gate 411, in the combinational blocks 401 and 402. The floating hot spare oscillator signal is coupled as an input to the second of the two AND gates, such as AND gate 412 in the blocks 401 and 402. The control signal NSWTCH is applied as one input to the first AND gate, such as AND gate 411 in the modules 401 and 402. The signal NSWTCH is inverted via inverters 441 and 442 prior to being coupled to the inputs of the second AND gates, such as AND gate 412, in the combinational logic blocks 401, 402. The control signal SWTCH is provided as an input to the second NAND gate, such as NAND gate 412, in the logic blocks 401, 402 and is inverted, by inverters 451 and 452, before being provided as a second input to the first NAND gate, such as NAND gate 411, in the combinational logic blocks 401, 402.

The multiplexer is a duplicated design so that the floating hot spare clock signal can still be switched in and broadcasted to two other voting core clock modules if one of the multiplexers fails. The multiplexer uses a complimentary pair of control signals for its control inputs. Since the control signal SWTCH to the multiplexer is not part of the oscillator loop, failure to this signal is not detected. If multiple faults occur to all SWTCH signals such that the floating hot spare module signal cannot be switched in, then two voting core module oscillator failures can wipe out the fault tolerant clock without warning. To prevent this situation from occurring, the SWTCH signal is designed to be self-checking. A non-coded (i.e., coded=01 or 10) signal would result in the multiplexer output being at a zero state and therefore is detected.

Figure 8:
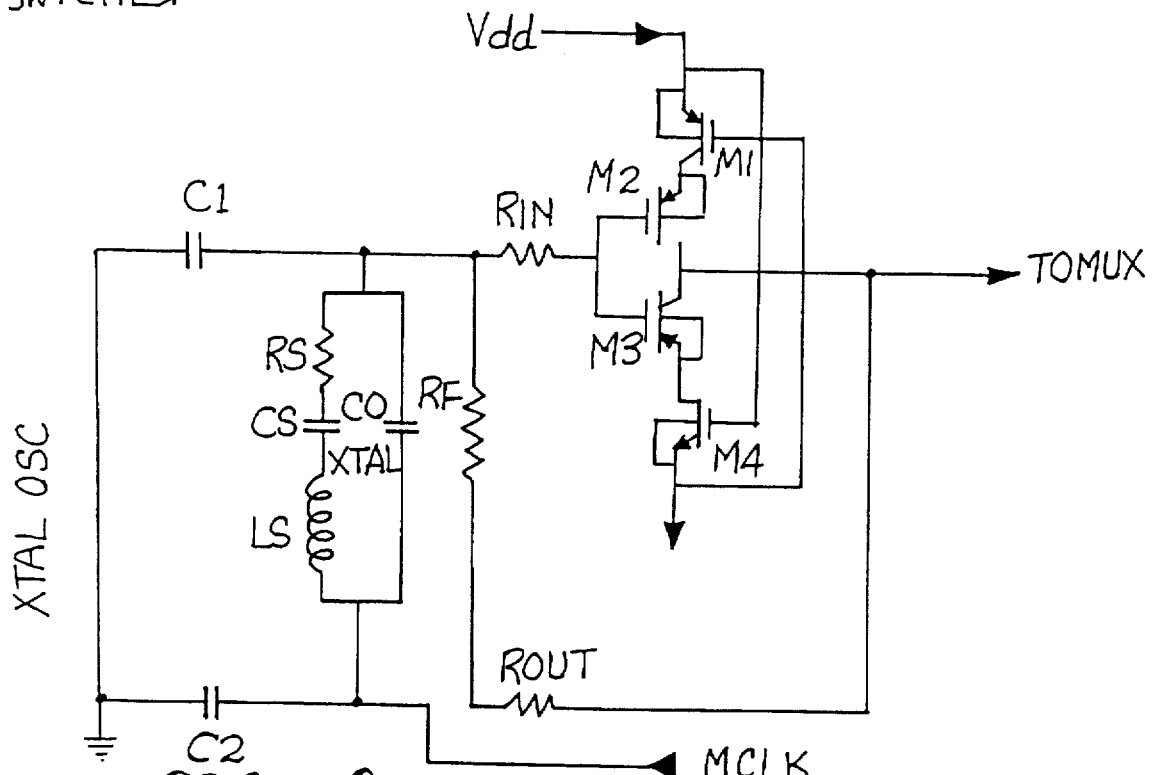
FIG. 8 is a detailed schematic diagram of the crystal oscillator.

FIG. 8 is a detailed schematic diagram of the preferred embodiment of the crystal oscillator according to the present invention. The on-chip amplifier of the crystal oscillator utilizes a high gain, single stage CMOS inverter that is biased at its mid-range to act an linear amplifier for the clock signal. The oscillator self-starts from random (thermal) circuit noise and the signal is positively fed back until saturation is reached. The amplifier provides a nominal 180° phase shift in addition to the 180° phase shift provided in the feed back loop. As shown in FIG. 8, the basic crystal oscillator is a parallel resonant configuration using a crystal (XTAL) having a capacitance CO paralleled by a series resistor and capacitor RS, CS, with a series inductor LS. In parallel with the amplifier is a resistor RF. The opposite ends of the crystal are tied to ground via capacitors C1 and C2. All circuit parasitic elements, on chip or off chip, are lumped into the bulk capacitors as indicated. The tank circuit is coupled to the inverter comprised of complimentary CMOS transistors M1–M4. RIN and ROUT represents the amplifier input impedance and output impedance respectively. Power is applied to the inverter stage through a power line Vdd.

The output from the inverter stage is coupled to the multiplexer, as is shown in FIGS. 1, 2, and 7. Input to the crystal tank circuit is the voted clock signal MCLK.

The crystal is designed to exhibit a very sharp phase versus frequency response at the resonant frequency. Resistor RIN helps set the phase in the feedback loop and also isolate the crystal from the input to the amplifier M1–M4. The bulk capacitors C1, C2 parallel the internal capacitance of the output amplifier to help reduce the effect of amplifier variation. The crystal is operated in a region in which it exhibits inductive reactance that is parallel resonated with the external bulk capacitors to create a high impedance peak at the frequency of oscillation. The crystal in the parallel resonant circuit operates in its inductive region between the resonant and anti-resonant frequencies within which its phase varies by a large range with very small change in frequency. In other words, extremely small frequency shifts (less than 0.01% or 100 ppm) are sufficient to change the crystal's impedance to compensate for phase deviations around the loop. The frequency plane characteristic of the crystal is such that additional phase delay incurred by the multiplexing and buffering in voting networks can be tolerated and translated into a small frequency shift. Since the voter in each module receives identical sets of inputs signals, as long as the crystals have a common pulling range, frequency shift due to phase deviation and environmental changes, such as temperature will be common among the modules.

Figure 9:
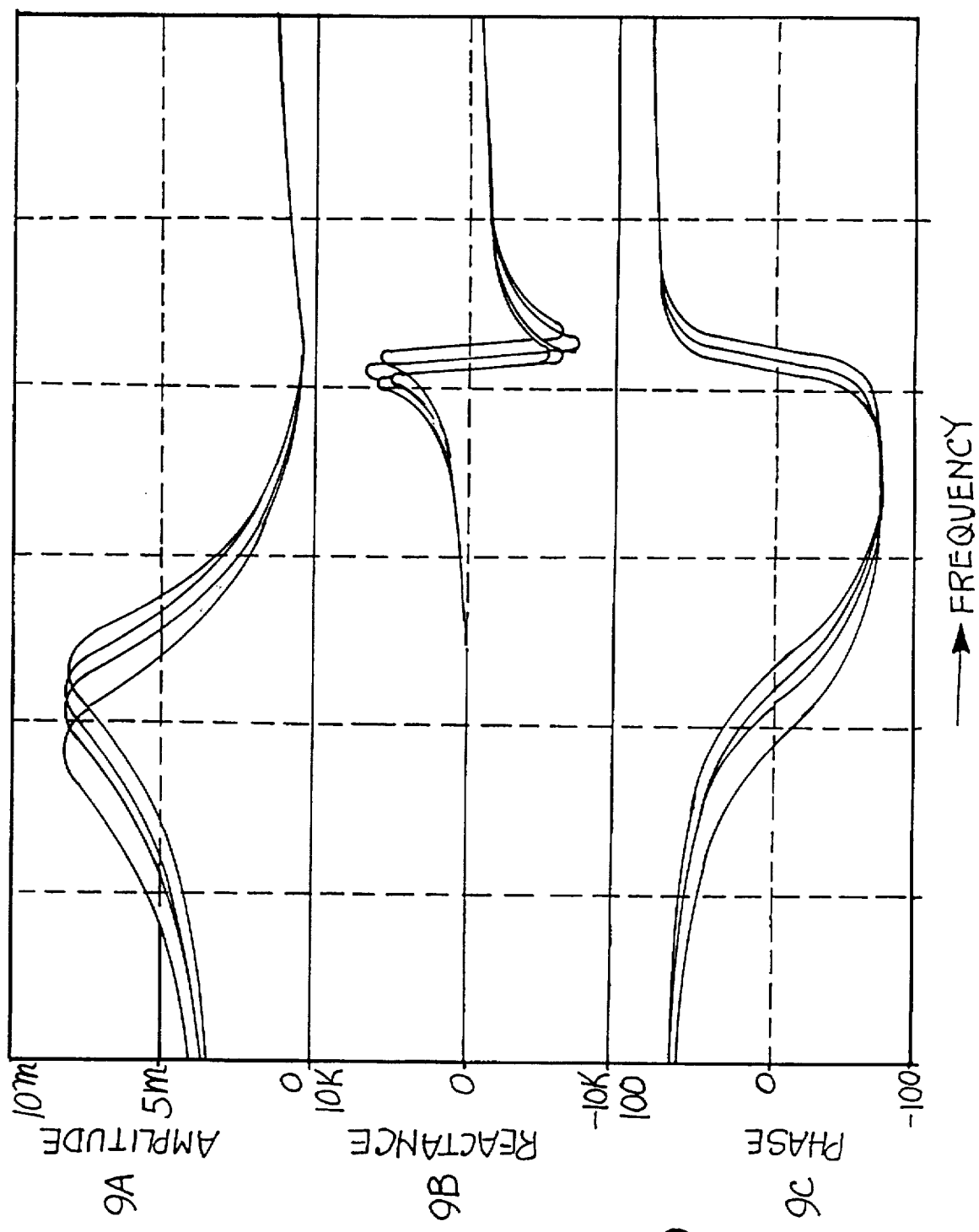
FIG. 9 illustrates the frequency response characteristics of the crystal oscillator shown in FIG. 8.

FIG. 9 illustrates the corresponding amplitude (9A), reactance (9B) and phase (9C) responses as exhibited by the crystals as used in the circuit in FIG. 8. Note that the reactance shows the common pulling range between the series resonant and parallel resonant frequency, where the reactance is inductive. Also notable is the large phase shift with very small frequency which changes resonance. Thus, the crystal oscillator shown in FIG. 8 is seen to phase lock with the inputing MCLK signal in all modules, thereby realizing tight synchronization.

Figure 10:
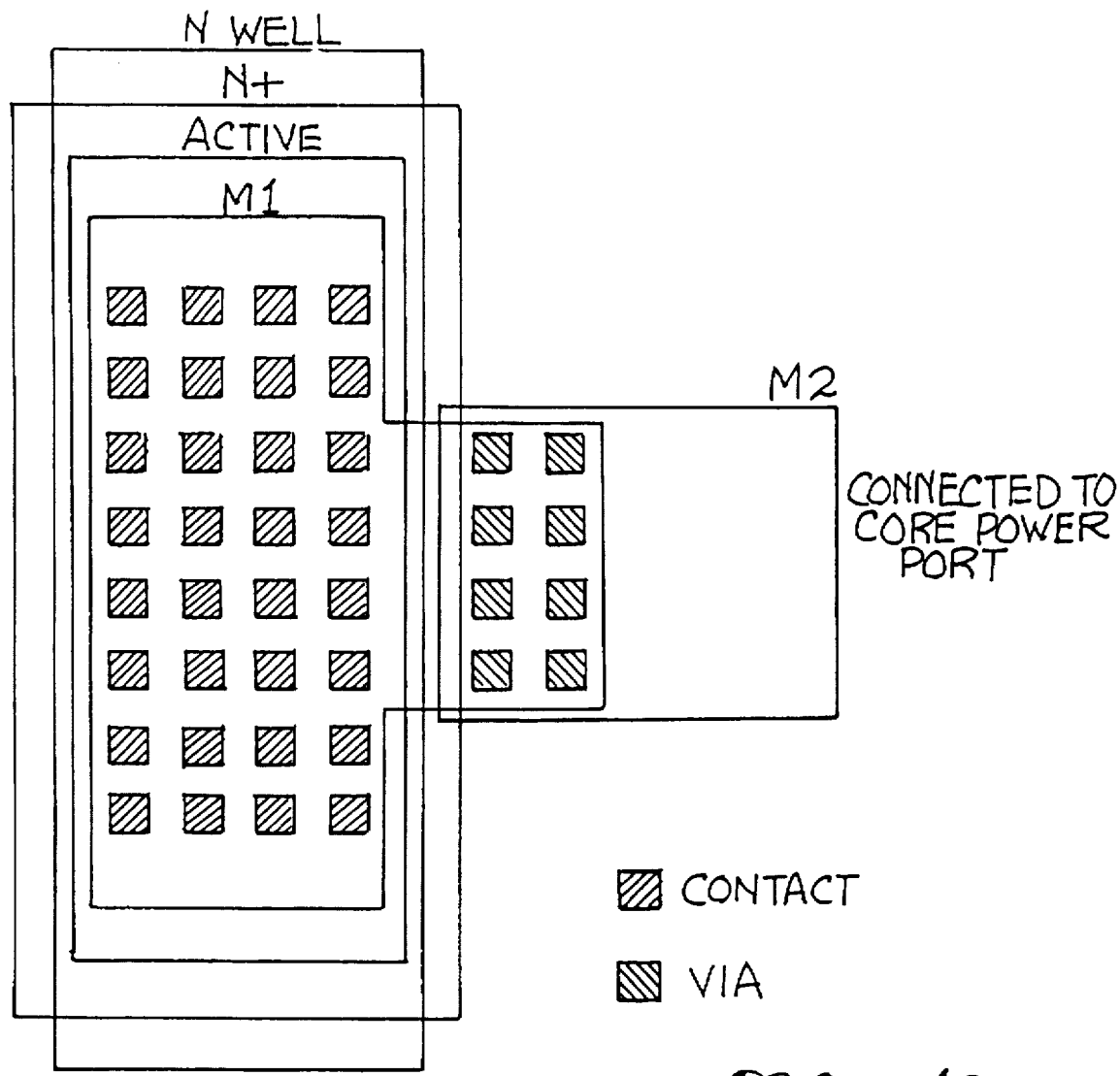
FIG. 10 is a block diagram illustrating the guard rings formed in the preferred single chip embodiment of the invention.

FIG. 10 illustrating the guard rings formed in the single semi-conductor chip of the preferred embodiment of the invention. Latch-up can occur in a CMOS device because of the presence of parasitic bipolar transistor in its structure. The bipolar transistor can collectively act as a silicon controlled rectifier (SCR). Under over-voltage stress or ionizing radiation, lateral current between the well and substrate can turn the SCR on, which draws large currents and locks the logic or even damages the circuit.

To isolate the redundant clock modules in case one module latches, P+ and N+ guard rings around each module are employed. The P+ ring is biased to ground and the N+ ring is biased to the bias voltage Vdd. For the P– type substrate, the P+ ring will collect the majority carriers (holes) and the N+ will collect the minority carriers (electrons) to prevent propagation of latch up current to the other modules.

FIG. 10 illustrates the N+ guard ring. Latch up protection for the input/output pads is achieved with each pad cell incorporating dual guard rings around its NMOS and PMOS transistors.

FIGS. 11–15 are representative signal waveforms for the preferred embodiment of the fault tolerant clock illustrating various failure modes and demonstrating fault tolerance. In the waveforms shown, failure of a clock module has been tested by removing its crystal and injecting a random fault into the crystal's amplifier input. As demonstrated in each of FIGS. 11–15, the output clock signals MCLK and PCLK are free of switch-over transients and the maintenance alert signal FSTS is asserted after two of the modules have failed. For purposes of understanding FIGS. 11–15, the three voting clock modules are given suffixes A, B, and C with a suffix of S denoting the hot spare module. The identified signals are:

ACLKA—the output from the crystal oscillator, module A;

MCLKA—the system clock (voted) clock output from module A;

PCLKA—the processor clock output from module A;

SFSTSA—the false status output from module A.

Figure 11:
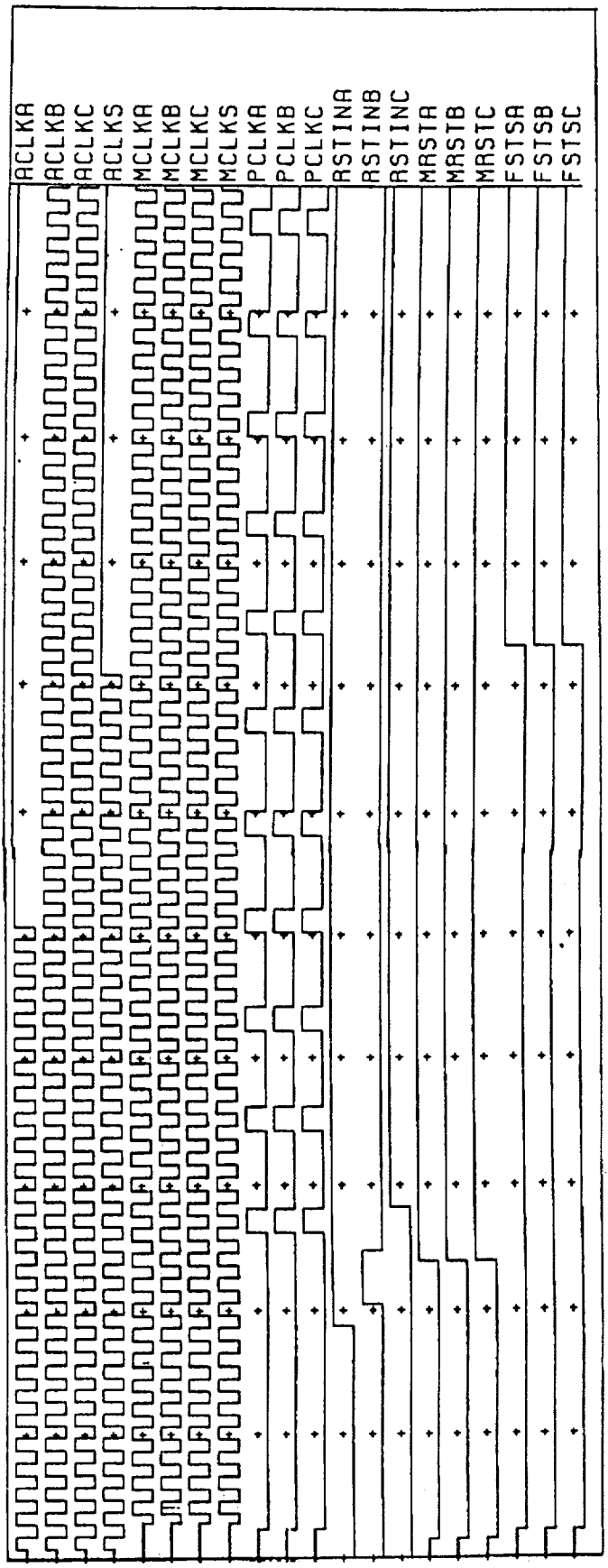
FIG. 11–15 are waveform diagrams illustrating operation of the fault tolerant clock under various failure conditions.

FIG. 11 illustrates one case of double clock failures. Here, module A fails then the floating hot spare fails sequentially. Note that all clock outputs are operational.

Figure 12:
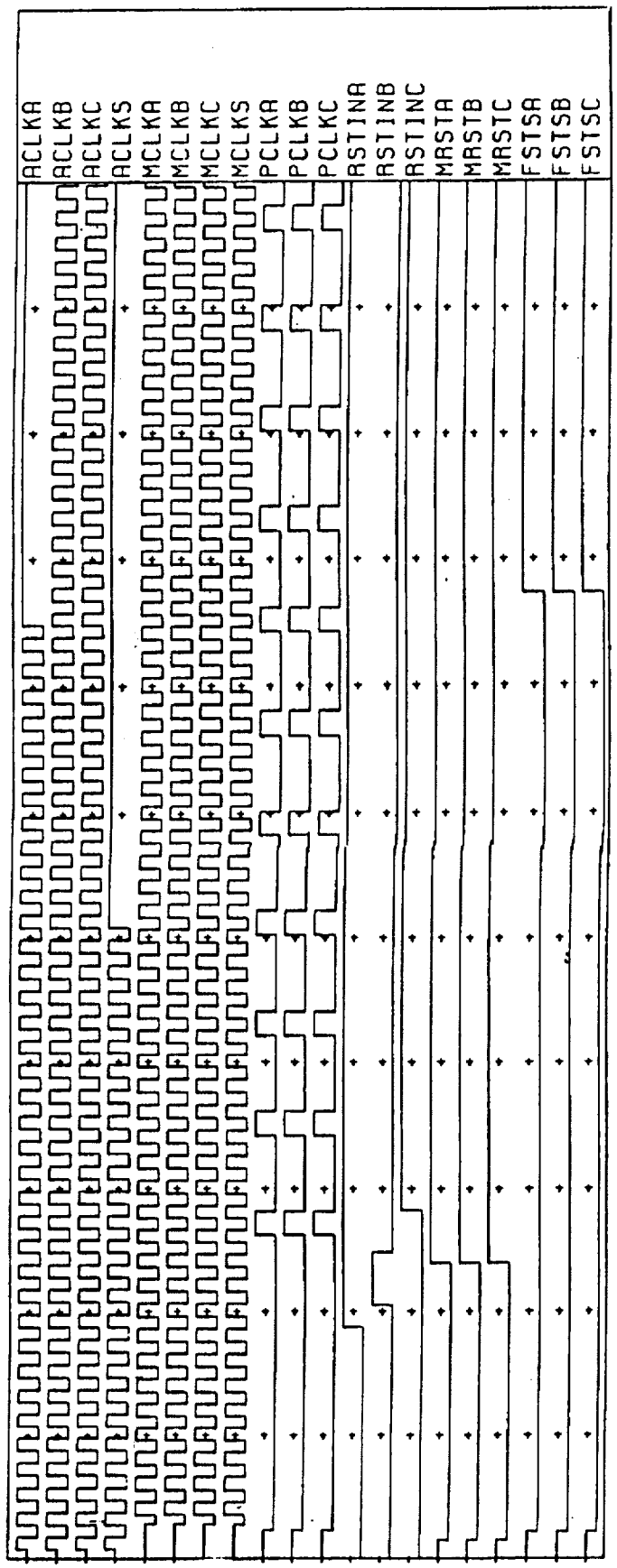

FIG. 12 illustrates another case of double clock failures. Here, the hot floating spare module fails first, which, as shown, has no effect on the voting core modules. Modules A then fails and, again, all clock outputs are operational.

Figure 13:
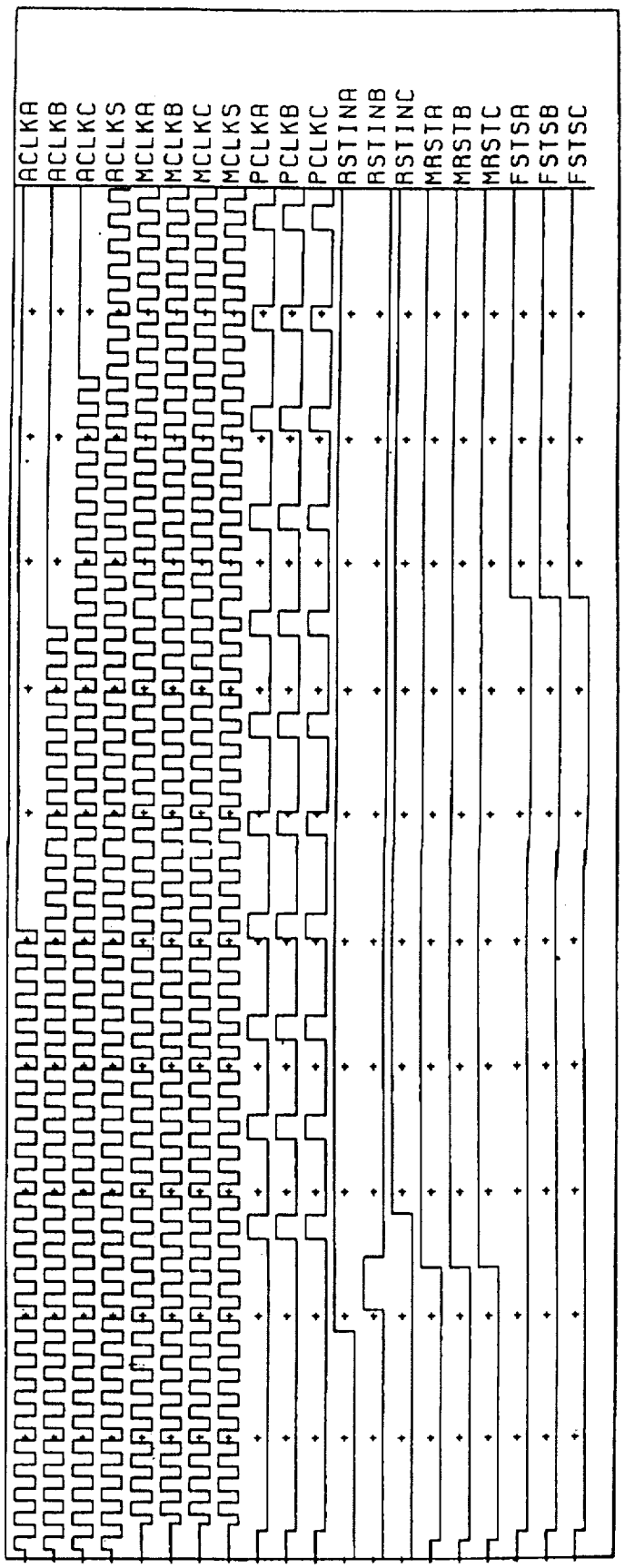

FIG. 13 illustrates the case of all voting core module clock failures. Here, a module A, then module B, and then module C sequentially fail. The floating hot spare signal is automatically switched in for each fault occurrence. All clock outputs are operational and are generated by the floating hot spare module's oscillator.

Figure 14:
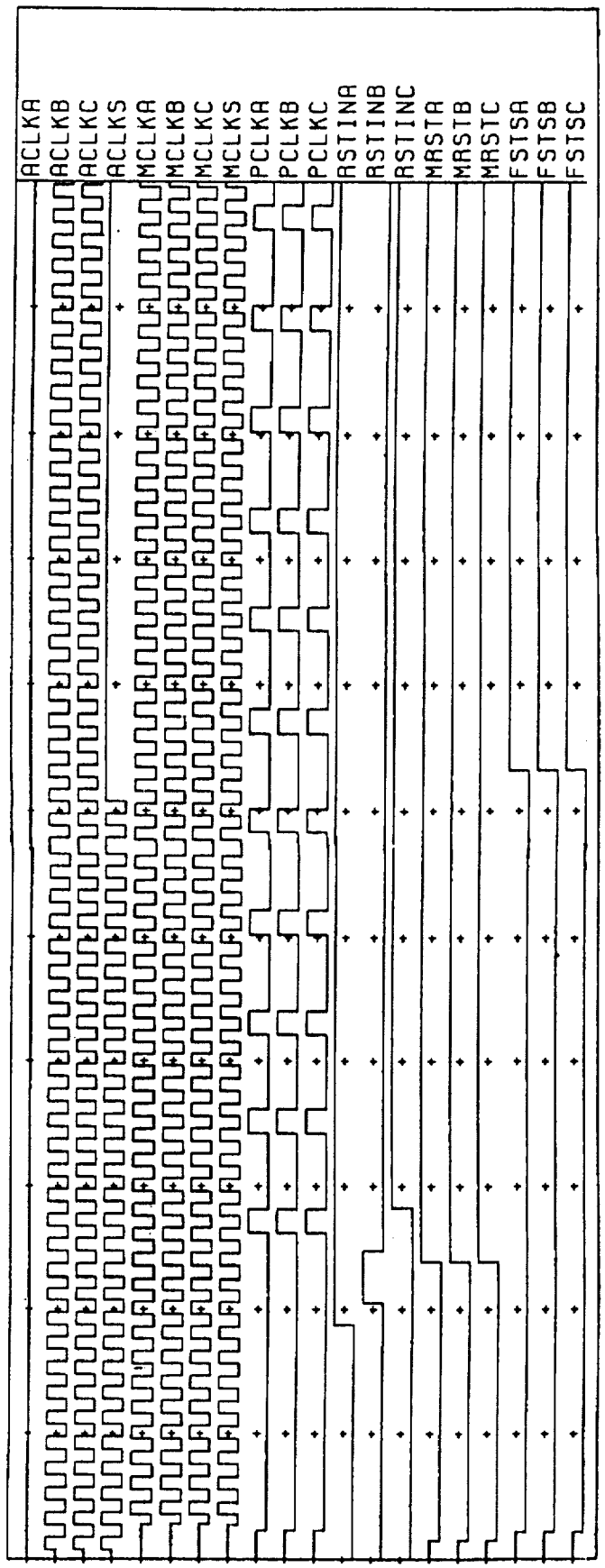

FIG. 14 illustrates the situation in which a malicious Byzantine failure occurs. Here, module A fails in such a way that it represents different signals to different modules—a high signal, a low signal, and a high impedance signal. Note that all clock outputs are operational. The floating hot spare module then fails. Note that all clock outputs are still operational.

Figure 15:
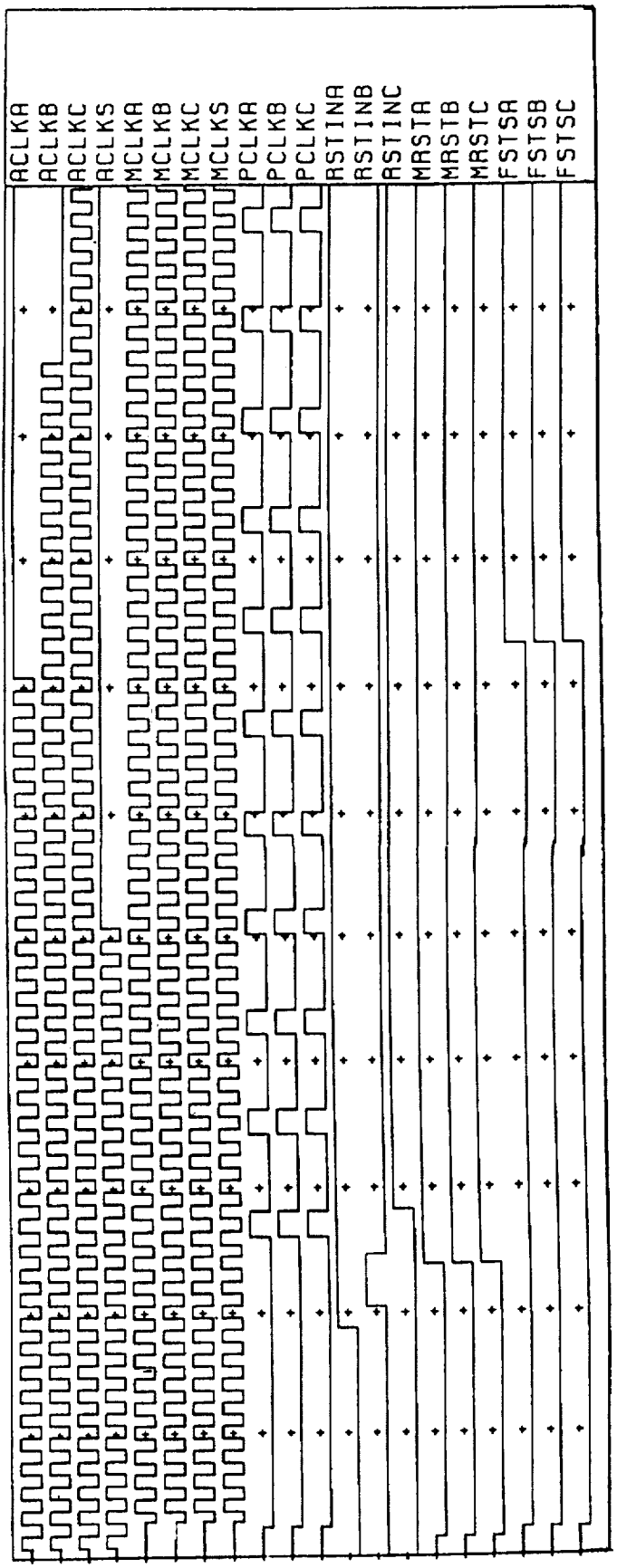

FIG. 15 illustrates another case of three clock failures. Here, the floating hot spare module fails first, then module A fails stuck at a high level, and then module B fails stuck at a low level. Modules A and B in this case fail compensating each other such that module C is still operation and all voted clock outputs are still functional.

In summary, an improved method and apparatus for providing a fault tolerant clock with dynamically reconfigurable clock architecture has been described in detail. The disclosed fault tolerant clock design is particularly described with respect to implementation on a single semiconductor chip which affords reduction in part count and yet is constructed in such a manner that high fault tolerance is assured.

While a preferred embodiment of the invention has been described in detail, it should be apparent that modifications and variations thereto are possible, all of which fall within the true spirit and scope of the invention.

I claim:

1. A fault tolerant clock comprising:

a voting core comprising a plurality of redundant clock modules, each clock module producing an output clock signal;

a floating hot spare clock module producing an output clock signal;

said fault tolerant clock further including:

voting means for producing a voted output clock signal from among said voting core redundant clock module produced output clock signals; and fault detecting, synchronizing and switching means for detecting a fault in at least one of said voting core redundant clock modules and, responsive thereto, synchronously substituting said floating hot spare clock module produced signal for the faulted voting core redundant clock module produced signal, whereby the voted output signal from the fault tolerant clock remains stable despite a failure in a voting core clock module.

2. The fault tolerant clock of claim 1 wherein each clock module further comprises:

a clock voter for receiving the output clock signals from the voting core clock modules and, in accordance with a predetermined voting algorithm, outputting a voted clock signal;

an oscillator for producing a periodic output signal;

a multiplexer having a pair of input terminals, an output terminal and a control terminal, the multiplexer responding to a control signal at its control terminal to switch a selected one of its input terminals to the output terminal;

means for coupling a module's own oscillator produced output signed to its multiplexer first input terminal and the output signal from said floating hot spare clock module oscillator to each multiplexer second input terminal; and fault detection identification and reconfiguration means for monitoring the output clock signal from each clock module and, responsive to detecting a fault in its own clock module, producing a control signal to switch said multiplexer from a state of outputting the clock module's own oscillator produced signal to outputting the floating hot spare clock oscillator produced signal.

3. The fault tolerant clock of claim 2 wherein all clock modules are fabricated on a single semiconductor chip.

4. The fault tolerant clock of claim 3 wherein:

power is provided via independent power connections to each clock module.

5. The fault tolerant clock of claim 3 wherein:

the semiconductor chip includes predetermined guard rings formed around each clock module to prevent propagation of latch up current form one clock module to any other clock module.

6. The fault tolerant clock of claim 3 wherein:

the semiconductor chip includes input and output pads for each clock module and the chip is formed with predetermined guard rings around each clock module input and output pad to prevent propagation of latch up current from one pad to any other pad.

7. The fault tolerant clock of claim 3 wherein:

a data bus is formed on the semiconductor chip to interconnect the clock modules; and selected interconnection points among the clock modules are buffer isolated and fabricated with point-to-point wiring, such that multiple faults on the data bus can be tolerated.

8. The fault tolerant clock of claim 2 wherein:

each clock module's oscillator is arranged to lock with the module's voted clock signal, such that all clock module output signals tend to run synchronously.

9. The fault tolerant clock of claim 8 wherein each clock module further comprises:

a processor clock generator for predeterminedly processing said voted output signal to produce a clock signal suitable for application to a data processor.

10. The fault tolerant clock of claim 2 wherein each clock module further comprises:

a processor clock generator for predeterminedly processing said voted output signal to produce a clock signal suitable for application to a data processor.

11. The fault tolerant clock of claim 1 wherein all clock modules are fabricated on a single semiconductor chip.

12. The fault tolerant clock of claim 11 wherein:

power is provided via independent power connections to each clock module.

13. The fault tolerant clock of claim 11 wherein:

the semiconductor chip includes predetermined guard rings formed around each clock module to prevent propagation of latch up current form one clock module to any other clock module.

14. The fault tolerant clock of claim 11 wherein:

the semiconductor chip includes input and output pads for each clock module and the chip is formed with predetermined guard rings around each clock module input and output pad to prevent propagation of latch up current from one pad to any other pad.

15. The fault tolerant clock of claim 11 wherein:

a data bus is formed on the semiconductor chip to interconnect the clock modules; and selected interconnection points among the clock modules are buffer isolated and fabricated with point-to-point wiring, such that multiple faults on the data bus can be tolerated.

16. The fault tolerant clock of claim 1 wherein each clock module further comprises:

a processor clock generator for predeterminedly processing said voted output signal to produce a clock signal suitable for application to a data processor.

17. A method for producing a fault tolerant clock signal comprising the steps of:

a) providing a voting core comprised of a plurality of redundant clock modules, each clock module producing an output clock signal;

b) providing a floating hot spare clock module which produces an output clock signal;

c) providing voting means for producing a voted output clock signal from among said voting core redundant clock module produced output clock signals; and d) providing fault detecting, synchronizing and switching means for detecting a fault in at least one of the voting core redundant clock modules and, responsive thereto, synchronously substituting said floating hot spare clock module produced signal for the faulted voting core redundant clock module produced signal, whereby said voted output signal remains stable despite a failure in a voting core clock module.

18. The method of claim 17 wherein each clock module further comprises the steps of:

1) providing a clock voter for receiving the output clock signals from the voting core clock modules and, in accordance with a predetermined voting algorithm, outputting a voted clock signal;

2) providing an oscillator for producing a periodic output signal;

3) providing a multiplexer having a pair of input terminals, an output terminal and a control terminal, the multiplexer responding to a control signal at its control terminal to switch a selected one of its input terminals to the output terminal;

4) coupling a module's own oscillator produced output signal to its multiplexer first input terminal and the output signal from said floating hot spare clock module oscillator to each multiplexer second input terminal; and 5) monitoring the output clock signal each clock module and, responsive to detecting a fault in its own clock module, producing a control signal to switch said multiplexer from a state of outputting the clock module's own oscillator produced signal to outputting the floating hot spare clock module oscillator produced signal.

19. The method of claim 18 further comprising the step of:

fabricating all of the clock modules on a single semiconductor chip.

20. The method of claim 19 further comprising the step of:

providing power to each clock module via independent power connections.

21. The method of claim 19 further comprising the step of:

fabricating the semiconductor chip with predetermined guard rings formed around each clock module to prevent propagation of latchup current from one clock module to any other clock module.

22. The method of claim 19 comprising the further steps of:

forming input and output pads for each clock module and further forming said semiconductor chip with predetermined guard rings around each clock module input and output pad to prevent propagation of latchup current from one pad to any other pad.

23. The method of claim 19 further comprising the steps of:

forming a data bus on the semiconductor chip to interconnect the clock modules, providing buffering for each clock module output, and interconnecting selected buffered clock module outputs via point-to-point wiring such that multiple faults on the data bus can be tolerated.

24. The fault tolerant clock of claim 18 further comprising the step of:

locking each clock module's oscillator produced signal with the voted clock signal, such that all clock module output signals tend to run synchronously.

25. The method of claim 24 including the further step of:

providing each clock module with a processor clock generator for predeterminedly processing the voted output signal to produce a clock signal suitable for application to a data processor.

26. The method of claim 18 including the further step of:

providing each clock module with a processor clock generator for predeterminedly processing the voted output signal to produce a clock signal suitable for application to a data processor.

27. The method of claim 17 further comprising the step of:

fabricating all of the clock modules on a single semiconductor chip.

28. The method of claim 27 further comprising the step of:

providing power to each clock module via independent power connections.

29. The method of claim 27 further comprising the step of:

fabricating the semiconductor chip with predetermined guard rings formed around each clock module to prevent propagation of latch up current from one clock module to any other clock module.

30. The method of claim 27 comprising the further steps of:

forming input and output pads for each clock module and further forming said semiconductor chip with predetermined guard rings around each clock module input and output pad to prevent propagation of latchup current from one pad to any other pad.

31. The method of claim 27 further comprising the steps of:

forming a data bus on the semiconductor chip to interconnect the clock modules, providing buffering for each clock module output, and interconnecting selected buffered clock module outputs via point-to-point wiring such that multiple faults on the data bus can be tolerated.

32. The method of claim 17 including the further step of:

providing each clock module with a processor clock generator for predeterminedly processing the voted output signal to produce a clock signal suitable for application to a data processor.

* * * * *